US010410040B2

United States Patent
Wong

(10) Patent No.: US 10,410,040 B2
(45) Date of Patent: Sep. 10, 2019

(54) FINGERPRINT LOCK CONTROL METHOD AND FINGERPRINT LOCK SYSTEM

(71) Applicant: BIO-KEY HONG KONG LIMITED, Jiang Men (CN)

(72) Inventor: Kwok Fong Wong, Hong Kong (CN)

(73) Assignee: BIO-KEY HONG KONG LIMITED, Jiangmen (CN)

( * ) Notice: Subject to any disclaimer, the term of this patent is extended or adjusted under 35 U.S.C. 154(b) by 0 days.

(21) Appl. No.: 15/660,308

(22) Filed: Jul. 26, 2017

(65) Prior Publication Data

US 2018/0373919 A1  Dec. 27, 2018

(30) Foreign Application Priority Data

Jun. 23, 2017 (CN) .......................... 2017 1 0490965

(51) Int. Cl.
*G06K 9/00* (2006.01)
(52) U.S. Cl.
CPC ..... *G06K 9/00087* (2013.01); *G06K 9/00013* (2013.01)
(58) Field of Classification Search
CPC .............. G06K 9/00087; G06K 9/00013
USPC ............................................ 382/125
See application file for complete search history.

(56) References Cited

U.S. PATENT DOCUMENTS

| 2006/0274920 A1* | 12/2006 | Tochikubo | G06F 21/32 |
| | | | 382/124 |
| 2013/0131774 A1* | 5/2013 | Nabulsi | A61F 2/95 |
| | | | 623/1.11 |
| 2015/0302086 A1* | 10/2015 | Roberts | G06F 17/30743 |
| | | | 707/771 |
| 2015/0365709 A1* | 12/2015 | Cho | H04N 21/25891 |
| | | | 725/13 |
| 2016/0112771 A1* | 4/2016 | Choi | H04N 21/4122 |
| | | | 725/14 |
| 2016/0165421 A1* | 6/2016 | Papakipos | G06Q 50/01 |
| | | | 455/418 |
| 2017/0083750 A1* | 3/2017 | Chin | H04L 63/0861 |
| 2017/0083898 A1* | 3/2017 | Sidhu | H04W 4/029 |

FOREIGN PATENT DOCUMENTS

CN  106263349  * 1/2017 ............. G06F 21/32

* cited by examiner

*Primary Examiner* — Jerome Grant, II
(74) *Attorney, Agent, or Firm* — Brundidge & Stanger, P.C.

(57) ABSTRACT

The invention provides a fingerprint lock control method and a fingerprint lock system. The system at least comprises a fingerprint lock, a server and an electronic device. The method comprises: scanning an identification code of a current fingerprint lock and uploading the identification code of the current fingerprint lock by the electronic device to the server, such that the current fingerprint lock is bound to account information of a user; collecting current fingerprint information of the user by a fingerprint reader on the current fingerprint lock; receiving a fingerprint information template of the user transmitted by the server by the electronic device; determining if the current fingerprint information matches the fingerprint information template; controlling and opening the current fingerprint lock, if yes. In the invention, the user don't need register repeatedly on the fingerprint locks, the unlocking procedure can be simplified and unlocking time can be saved significantly.

8 Claims, 2 Drawing Sheets

FINGERPRINT LOCK CONTROL METHOD AND FINGERPRINT LOCK SYSTEM ==

== FIELD OF THE INVENTION ==

The invention relates to the technology field of fingerprint locks, and more particularly to a fingerprint lock control method and a fingerprint lock system.

== DESCRIPTION OF THE RELATED ART ==

Fingerprint locks are intelligent locks, and usually considered as perfect crystallization of Computer Information Technology, Electronic Technology, Mechanical Technology and Modern hardware technology. The characteristics of fingerprints have become the most important evidence of identity recognition, and thus are widely used in the fields of Public Security Criminal Investigation and Justice. Fingerprint authentication has the characteristics of convenience, quick response and accuracy and the like. With the popularization of science and technology, more and more people begin to choose fingerprint locks.

Currently, there are a variety of fingerprint locks on the market, in these fingerprint locks registration is completed on the fingerprint locks individually such that the fingerprint information is stored in the fingerprint locks, or alternatively, the fingerprint information is stored in a mobile phone under control of an application program. Either way, a user needs to re-register when he/she uses a new fingerprint lock.

== SUMMARY OF THE INVENTION ==

In order to solve the above problem of the prior art, the invention provides a fingerprint lock control method for a fingerprint lock system, the fingerprint lock system at least comprises a fingerprint lock, a server and an electronic device, wherein the method comprises steps of:
(1) scanning an identification code of a current fingerprint lock and uploading the identification code of the current fingerprint lock by the electronic device to the server, such that the current fingerprint lock is bound to account information of a user;
(2) collecting current fingerprint information of the user by a fingerprint reader on the current fingerprint lock;
(3) receiving a fingerprint information template of the user from the server by the electronic device;
(4) determining if the current fingerprint information is matched with the fingerprint information template;
(5) controlling and opening the current fingerprint lock, if yes.

Preferably, the method also comprises the step of:
not opening the current fingerprint lock when it is determined that the current fingerprint information is not matched with the fingerprint information template.

Preferably, before the step of scanning an identification code of a current fingerprint lock and uploading the identification code of the current fingerprint lock by the electronic device to the server, such that the current fingerprint lock is bound to account information of a user, the method also comprises:
inputting the account information of the user by the electronic device, to achieve account registration of the user on the server.

Preferably, the method also comprises:
scanning an identification code of an initial fingerprint lock and uploading the identification code of the initial fingerprint lock by the electronic device to the server, such that the initial fingerprint lock is bound to the account information of the user; and
controlling and opening the initial fingerprint lock.

Preferably, before the step of scanning an identification code of a current fingerprint lock and uploading the identification code of the current fingerprint lock by the electronic device to the server, such that the current fingerprint lock is bound to account information of a user, the method also comprises:
determining if the user is an administrator of the fingerprint lock, the administrator being a user using the current fingerprint lock for the first time; and
receiving an authorization message from the administrator, if not.

Preferably, the method also comprises:
determining if the binding between the initial fingerprint lock and the account information of the user is a first binding of the initial fingerprint lock; and
setting the user as an administrator and setting the account information of the user as administrator account information, if yes.

Based on the same inventive concept, the embodiments of the invention also provide a fingerprint lock system, and the fingerprint lock system comprises a fingerprint lock, an electronic device and a server.

The fingerprint lock is provided with a finger reader and a wireless communication module. The fingerprint reader is used for collecting a fingerprint information template. The wireless communication module is used for transmitting the fingerprint information template to the electronic device. An identification code is provided on the outer surface of the fingerprint lock.

The electronic device comprises a camera. The camera is used for scanning an identification code on the fingerprint lock. The electronic device is used for uploading the identification code and the fingerprint information template to the server. The server is used for storing the identification code and the fingerprint information template.

Preferably, the electronic device comprises an input device, and a user inputs the account information by the input device. The server is used for storing the account information of the user and the fingerprint information template of the user.

Preferably, the fingerprint lock comprises a processor. The processor is used for determining if the current fingerprint information is matched with the fingerprint information template, and controlling and opening the fingerprint lock when the current fingerprint information is matched with the fingerprint information template.

Preferably, the fingerprint lock system also comprises at least one bicycle. The number of the bicycle is corresponding to the number of the fingerprint lock. The fingerprint lock is detachably mounted on the bicycle.

By means of the fingerprint control method and fingerprint lock system of the embodiments of the invention, the invention has the following advantages: when a user uses multiple fingerprint locks in a fingerprint lock system, registration is needed only in the first use of the fingerprint locks, and the account information will be stored in the server of the fingerprint lock system. Later, the user don't need register repeatedly on the fingerprint locks in the fingerprint lock system when he/she use the fingerprint locks in the fingerprint lock system again, thus, the unlocking procedure can be simplified greatly and the unlocking time can be saved significantly.

== BRIEF DESCRIPTION OF THE DRAWINGS ==

In order to illustrate more clearly the technical solutions of the embodiments of the invention, the drawings used in the embodiments will be described simply hereinafter. Obviously, the drawings are given by way of example, and for a person skilled in the art, other equivalent drawings can be obtained according to these drawings without any creative work.

DETAILED DESCRIPTION OF THE INVENTION

In order to make the object, technical solutions and advantages of the invention more clearly, the embodiments will be described hereinafter in more detail in connection with drawings.

Figure 1:
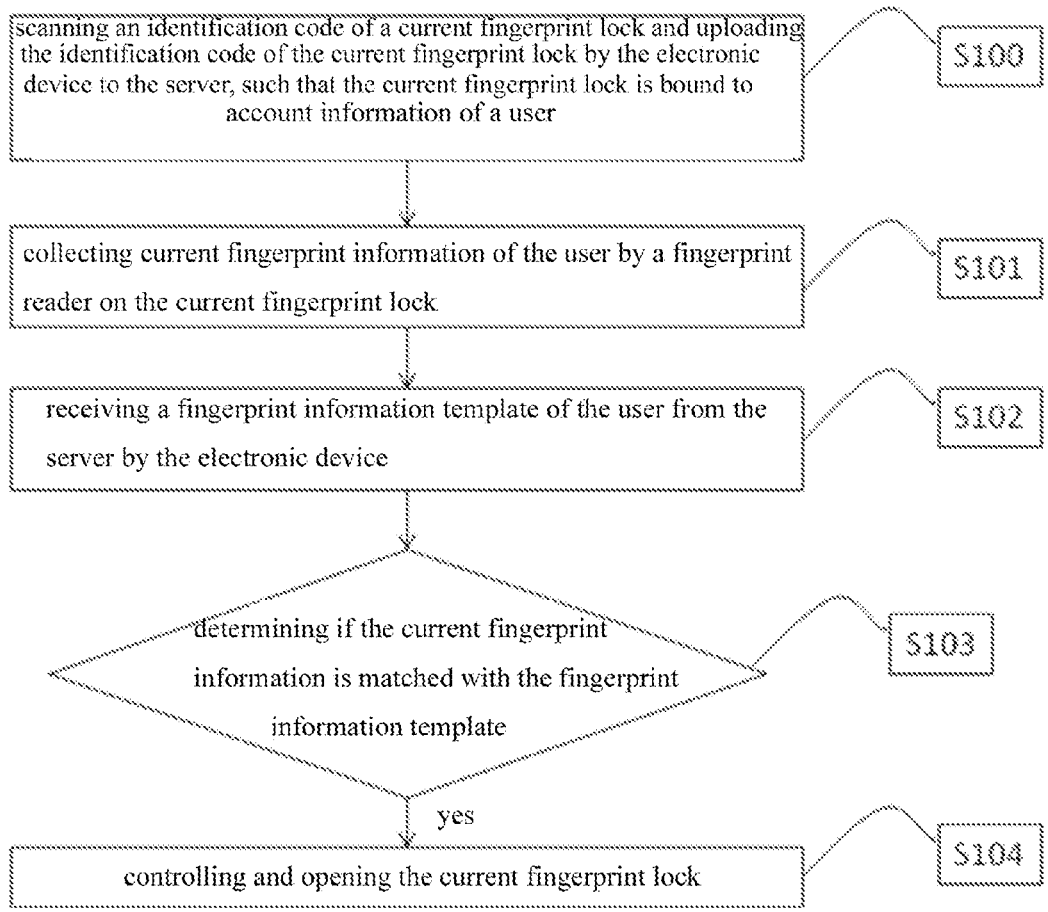
FIG. 1 is a flow chart of a fingerprint lock control method according to some embodiments of the invention.
Figure 2:
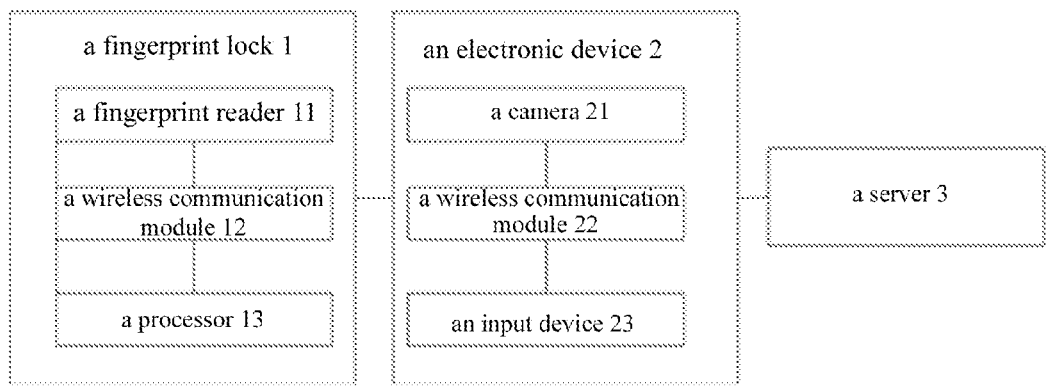
FIG. 2 is a schematic view of a fingerprint lock system according to some embodiments of the invention.

As shown in FIG. 1, a fingerprint lock control method is provided in embodiments of the invention, it should be noted that, the fingerprint lock control method provided in the embodiments of the invention can be used in the fingerprint lock system shown in FIG. 2. The fingerprint lock system may comprise at least one fingerprint lock 1, an electronic device 2 and a server 3. The fingerprint lock 1 can be communicated with the electronic device 2 via wireless communication, and the electronic device 2 can be communicated with the server 3 via internet. As shown in FIG. 1, the fingerprint lock control method of the embodiment s of the invention can comprises the following steps:

step S100: scanning an identification code of a current fingerprint lock and uploading the identification code of the current fingerprint lock by the electronic device to the server, such that the current fingerprint lock is bound to account information of a user.

It should be noted that, there may be a plurality of fingerprint locks in the fingerprint lock system. In the embodiments of the invention, the current fingerprint lock is set as a fingerprint lock other than the fingerprint lock in the fingerprint lock system firstly used by the user (such as the initial fingerprint lock described as below).

The fingerprint locks of the embodiments of the invention all have unique identification codes respectively, the unique identification codes are corresponding to the fingerprint locks and used for identify uniquely the corresponding fingerprint locks. In some embodiments, the identification codes may be bar codes, two-dimensional codes or other graphic codes which can identify uniquely corresponding fingerprint locks.

The camera on the electronic device can be used for scanning the identification code of the current fingerprint lock.

The server can store the account information of the user (including account name and/or password), the fingerprint information template and/or finger lock information, and even the operational procedure of the fingerprint lock system and the like.

It should be noted that, in some embodiments, before the step S100 the fingerprint lock control method of the embodiments of the invention also can comprise the following step: inputting account information of the user by the electronic device, to achieve account registration of the user on the server 3.

In some embodiments, the electronic device may be provided with a touch screen, and the user can input account information via the touch screen.

For example, an application program can be installed on the electronic device for assisting to control the fingerprint locks. When the user uses the application program for the first time, he/she registers in the application program. For example, the user inputs an account name and a password to complete the registration. After registration, the user can log in the application program use the account information, and subsequently the user can use any fingerprint locks in the fingerprint lock system once authentication is successful.

After the registration is completed, the account information of the use is stored in the server.

step S101: collecting current fingerprint information of the user by a fingerprint reader on the current fingerprint lock.

A fingerprint reader (such as a fingerprint sensor) or fingerprint collection area can be provided on the fingerprint lock, and the user can input fingerprint information by the fingerprint reader or the fingerprint collection area.

It should be noted that, when the user uses anyone of the fingerprint locks in the fingerprint lock system for the first time, he/she can input the fingerprint information on the firstly used fingerprint lock, and sends the fingerprint information by the electronic device to the server for storing as a fingerprint information template.

It is noted that, after the user registers in the application program and inputs fingerprint information (namely, fingerprint information template) for the first time, if the fingerprint lock is used for the first time, then the fingerprint lock on which the fingerprint information is input is opened.

The user inputs fingerprint on the firstly used fingerprint lock (the fingerprint lock is used for the first time), then the user is set as an administrator of the firstly used fingerprint lock. Any of the other users' needs to be authorized by the administrator (first user) to bind to or use this fingerprint lock.

Next, when the user uses any one of the fingerprint locks in the fingerprint lock system, the fingerprint information input on the corresponding fingerprint lock by the user is compared to the fingerprint information template stored in the server, if successful, then the user is authenticated, otherwise the authentication fails.

step S102: receiving a fingerprint information template of the user transmitted by the server by the electronic device.

Then, the electronic device can transmit the fingerprint information template to the current fingerprint lock via wireless transmission, such as Bluetooth, but not limited to Bluetooth.

The identification code of the current fingerprint lock is scanned and uploaded to the server by the electronic device, and the fingerprint lock system is informed that the fingerprint lock system is used by the user. Then, the fingerprint information template of the user is transmitted to the fingerprint lock via the electronic device by the server.

It is noted that, the users are corresponding to the account information. Logging in the application program via certain account information means the default that the fingerprint lock in the fingerprint lock system is used by the user corresponding to the certain account information.

It should be appreciated that, the above step S101 and the step S102 are not performed in sequence, the step S101 can be performed firstly and the step S102 is performed later, or the step S102 can be performed firstly and the step S101 is performed later, or alternatively the steps S101 and S102 are performed simultaneously.

step S103: determining if the current fingerprint information is matched with the fingerprint information template, if yes, then performing the step S104, if not, then performing the step S105.

The current fingerprint information is compared to the fingerprint information template stored in the server, if matches the user is authenticated, otherwise the authentication fails.

The term "matching" described here may mean that the current fingerprint information is consistent with the fingerprint information template in some extent or fully, this depends on the user's definition.

Step S104: controlling and opening the current fingerprint lock.

If authentication is passed, then the step S104 is performed, and the current fingerprint lock is opened.

In the fingerprint lock control method of the embodiment of the invention, when a user uses multiple fingerprint locks in a fingerprint lock system, registration is needed only in the first use of the fingerprint locks, and the account information will be stored in the server of the fingerprint lock system. Later, the user don't need register repeatedly on the fingerprint locks in the fingerprint lock system when he/she use the fingerprint locks in the fingerprint lock system again, thus, the unlocking procedure can be simplified greatly and the unlocking time can be saved significantly.

It is noted that, in some embodiments of the invention, the first user binding to the fingerprint lock of the fingerprint lock system may be an administrator, and the corresponding account information is the administrator account information. The administrator account information includes a user name, a password, a fingerprint information template of the administrator and the like.

When the administrator uses the fingerprint lock in the fingerprint lock system personally, the administrator inputs the current fingerprint information on the fingerprint lock, and the fingerprint lock is opened if the fingerprint information is matched with the fingerprint information template.

The administrator also can authorize others to use the fingerprint lock in the fingerprint lock system. For example, a user A logs in the application program corresponding to the fingerprint lock system using the administrator account information, and inputs the current fingerprint information of the user A on the current fingerprint lock, then an authorization request message may be received by the electronic device of the administrator. If the administrator agrees that the user A uses the fingerprint lock in the fingerprint lock system, then an authorization message may be sent to open the current fingerprint lock. If the administrator doesn't agree that the user A uses the fingerprint lock in the fingerprint lock system, then the authorization message may not be sent and the current fingerprint lock is not bound to the account number of the user A. This is particularly applicable in the case that the fingerprint lock system is used by a company or group.

For the above situation, in some embodiments of the invention, the above fingerprint lock control method may also comprise the following step:

determining that that the current fingerprint information is not matched with the fingerprint information template stored in the server, and not opening the fingerprint lock. Wherein the administrator may be a user corresponding to the fingerprint information template and the user corresponding to the current fingerprint information is not the administrator.

In some embodiments, the administrator authorization request message sent to the electronic device by the fingerprint lock may be displayed on a display screen of the electronic device. If the administrator agrees that the user uses the fingerprint lock, then the authentication message can be input via the display screen of the electronic device, and the authentication message is sent to the server by the electronic device to control if the current fingerprint lock can be bound to the user.

In the above embodiments, the user may lock the fingerprint lock after the fingerprint lock is opened and used. There are many ways to lock the fingerprint lock, for example, the lock head is engaged manually into the lock body for locking, or alternatively payment is completed on a mobile device for electronically locking, and so on.

In some embodiments, after the fingerprint lock is locked, the binding between the fingerprint lock and the user account information is still not released. The account information of one user may be bound to a plurality of fingerprint locks simultaneously.

It is noted that, the fingerprint lock system may comprise a plurality of fingerprint locks therein, and account information of one user can be bound to two or more fingerprint locks simultaneously, also can be bound one of the fingerprint locks. In some embodiments of the invention, after the fingerprint lock is locked, the current fingerprint lock can be unbound to the user account information. In other some embodiments of the invention, after the fingerprint lock is locked, the current fingerprint lock can also be not unbound to the user account information.

After the fingerprint lock is locked, the locking message is sent to the server via the electronic device, such that the current fingerprint lock is unbound to the user account information. Unbinding means that the user ends the use of the current fingerprint lock, and the user also can use the other fingerprint locks in the fingerprint lock system under the user account information.

Based on the same inventive concept, the embodiments of the invention also provide a fingerprint lock system, as shown in FIG. 2. The fingerprint lock system may comprise at least one fingerprint lock 1, an electronic device 2 and a server 3. The fingerprint lock can be communicated with the electronic device via wireless communication, and the electronic device can be communicated with the server via internet.

wherein the fingerprint lock is provided with a fingerprint reader 11 and a wireless communication module 12. The fingerprint reader is used for collecting the fingerprint information of the user. The wireless communication module is used for sending the fingerprint information of the user to the server via the electronic device.

An identification code is provided on the outer surface of the fingerprint lock. Furthermore, the wireless communication module also can be used for receiving the fingerprint information template sent by the electronic device.

The identification code is corresponding to the fingerprint lock, and is used for identifying uniquely the corresponding fingerprint lock. In some embodiments, the identification code may be a bar code, a two-dimensional code or other graphic codes which can identify uniquely the corresponding fingerprint locks. The identification code can be provided on the front side, back side or lateral side of the fingerprint lock.

The electronic device comprises a camera 21 and a wireless communication module 22. The camera can be used for scanning the identification code on the fingerprint lock, and then the electronic device uploads the identification code scanned by the camera to the server. The electronic device can be used for receiving the fingerprint information template sent by the server, and transmitting the fingerprint information template to the fingerprint lock via the wireless communication module thereon.

The server 3 is used for storing the identification code unloaded by the electronic device.

In some embodiments, the electronic device also comprises an input device 23, the user can input account information (such as an account name or a password) by the input device. The server is also used for storing the user account information collected and uploaded by the electronic device. And, the server is also used for storing the fingerprint information template which is the fingerprint information input via the firstly used fingerprint lock when the user uses the fingerprint lock system for the first time.

In some embodiments, the fingerprint lock also comprises a processor 13. The processor 13 is used for determining if the current fingerprint information input by the user is matched with the fingerprint information template stored in the server, if yes, the current fingerprint lock is opened, and the current fingerprint lock is the fingerprint lock used by the user while inputting the current fingerprint information.

It is noted that, the above processor may be an embedded processor. Furthermore, the fingerprint lock also can comprise fingerprint algorithm. The fingerprint algorithm is used for recognizing if the current fingerprint information is matched with the fingerprint information template, and controlling the opening of the fingerprint lock based on the logic result of matching recognition.

In some embodiments, the fingerprint lock system shown in FIG. 2 also comprises at least one bicycle, and the number of the bicycle in the fingerprint lock system is corresponding to the number of the fingerprint lock. The fingerprint lock is detachably mounted on the bicycle.

Figure 3:
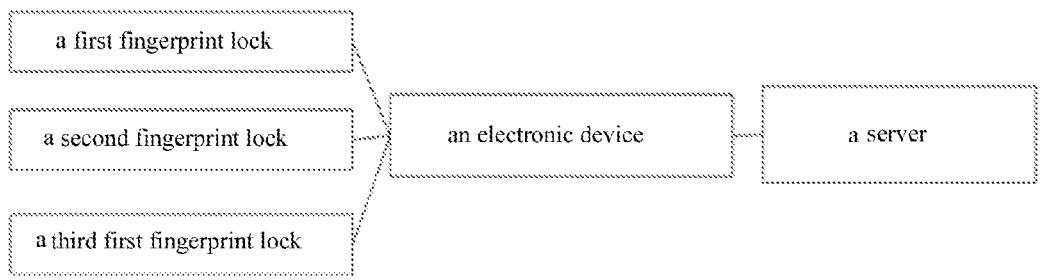
FIG. 3 is a schematic view of a fingerprint lock system according to one specific embodiment of the invention.

In order to further illustrate the technical solutions mentioned in the fingerprint lock control method and/or fingerprint lock system of the embodiments of the invention, the above technical solutions are further explained by taking FIG. 3 as an example.

As shown in FIG. 3, the fingerprint lock system comprises a first fingerprint lock, a second fingerprint lock, a third fingerprint lock, a mobile phone (belong to the electronic device) and a server. The first fingerprint lock, the second fingerprint lock and the third fingerprint lock can be wirelessly communicated with the mobile phone, and the mobile phone can be connected with the server via Internet.

An application program APP corresponding to the fingerprint lock system can be installed on the mobile phone. When a user B opens the APP for the first time, he/she can input the user name and password on the interface of the APP to complete registration. APP generates account information corresponding to the user, and the electronic device uploads the account information to the server for storing.

The first fingerprint lock is used when the user B uses the fingerprint lock in the fingerprint lock system for the first time, and the user B is the user who uses the first fingerprint lock firstly, and then the user B is an administrator of the first fingerprint lock.

The user B scans a first identification code of the first fingerprint lock using the camera on the electronic device, the electronic device uploads the first identification code to the server, and the serve binds the first fingerprint lock corresponding to the first identification code to the account information of the user B.

The user B inputs fingerprint information on the first fingerprint lock, and the first fingerprint lock sends the fingerprint information via the electronic device to the server for storing as a fingerprint information template corresponding to the account information, meanwhile, the first fingerprint lock is opened.

After the user B ends the use of the first fingerprint lock, the first fingerprint lock is locked, and the first fingerprint lock can also still be bound to the account information of the user B.

A second fingerprint lock is used when the user B uses the fingerprint lock system for the second time.

The user B scans a second identification code of the second fingerprint lock using the camera on the electronic device, and the electronic device uploads the second identification code to the server, and the serve binds the second fingerprint lock corresponding to the second identification code to the account information of the user B.

The user B inputs fingerprint information on the second fingerprint lock. Simultaneously or sequently, the fingerprint lock obtains the fingerprint information template of the user B stored by the server, and the input current fingerprint information is compared to the fingerprint information template. If the input current fingerprint information matches the fingerprint information template, then the second fingerprint lock is opened.

Furthermore, a user C also can use the first fingerprint lock in the fingerprint lock system. Considering the administrator of the first fingerprint lock is the user B, the user C can scan the first identification code of the first fingerprint lock using the camera on the electronic device, and the electronic device uploads the first identification code to the server. Before the server binds the first fingerprint lock corresponding to the first identification code to the account information of the user C, it is needed to receive the authorization message form the administrator user B.

In the fingerprint lock control method and fingerprint lock system of the embodiments of the invention, when a user uses multiple fingerprint locks in the fingerprint lock system, registration is needed only in the first use of the fingerprint locks, and the account information will be stored in the server of the fingerprint lock system. Later, the user don't need register repeatedly on the fingerprint locks in the fingerprint lock system when he/she use the fingerprint locks in the fingerprint lock system again, thus, the unlocking procedure can be simplified greatly and the unlocking time can be saved significantly.

It is noted that, the electronic device of the embodiments of the invention may be a mobile phone, a computer, a tablet, a wristwatch, a wrist strap, a bracelet and the like.

The electronic device can have or not have a touch screen. The server 3 of the embodiments of the invention may be a cloud server, and the server 3 may be a core controller of the fingerprint lock system, wherein the account information and fingerprint information of all of the registered users of the fingerprint lock system or information of locks (such as the identification code as described above) can be stored. Furthermore, the server 3 also can comprise a program that the fingerprint lock system runs.

The numberings of the embodiments are given only for description, instead of representing the quality of the embodiments.

A person skilled in the art shall appreciate that, part or all of the steps achieving the above embodiments can be completed by means of hardware, or by instructing related hardware via a program, and the program may be stored in a computer-readable storage medium which may be a read only memory, magnetic disk or optical disc or the like.

The preferred embodiments as above described are not intended for limiting of the invention, any variations, equivalent substitutions, improvement within the spirit and scope of the invention are contained in the extent of protection of the invention.

What is claimed is:

1. A fingerprint lock control method for a fingerprint lock system at least comprising a fingerprint lock, a server and an electronic device, wherein the method comprises steps of:

scanning an identification code of a current fingerprint lock and uploading the identification code of the current fingerprint lock by the electronic device to the server, such that the current fingerprint lock is bound to account information of a user;

collecting current fingerprint information of the user by a fingerprint reader on the current fingerprint lock;

receiving a fingerprint information template of the user from the server by the electronic device;

determining, by the fingerprint lock, if the current fingerprint information is matched with the finger print information template; controller and opening the current fingerprint lock, if yes; wherein before the scanning step, the method further comprises: determining if the user is an administrator of the fingerprint lock, the administrator being a user using the current fingerprint lock for the first time; and receiving an authorization message from the administrator, if not.

2. The fingerprint lock control method as claimed in claim 1, wherein the method also comprises:

not opening the current fingerprint lock when it is determined that the current fingerprint information is not matched with the fingerprint information template.

3. The fingerprint lock control method as claimed in claim 1, wherein before the step (1) the method also comprises:

inputting the account information of the user by the electronic device, to achieve account registration of the user on the server.

4. The fingerprint lock control method as claimed in claim 3, wherein the method also comprises:

scanning an identification code of an initial fingerprint lock and uploading the identification code of the initial fingerprint lock by the electronic device to the server, such that the initial fingerprint lock is bound to the account information of the user; and controlling and opening the initial fingerprint lock.

5. The fingerprint lock control method as claimed in claim 1, wherein the method also comprises:

determining if the binding between the initial fingerprint lock and the account information of the user is a first binding of the initial fingerprint lock; and setting the user as an administrator and setting the account information of the user as administrator account information, if yes.

6. A fingerprint lock system comprising a fingerprint lock, a server and an electronic device, wherein:

the fingerprint lock is provided with a finger reader for collecting a fingerprint information template, a processor for determining if the current fingerprint information is matched with the fingerprint information template, a wireless communication module for transmitting the fingerprint information template to the electronic device, and an identification code being provided on the outer surface of the fingerprint lock;

the electronic device comprises a camera for scanning an identification code on the fingerprint lock, the electronic device being used for uploading the identification code and the fingerprint information template to the server;

the server is used for storing the identification code and the fingerprint information template.

7. The fingerprint lock system as claimed in claim 6, wherein the electronic device comprises an input device by which a user inputs account information, the server being used for storing the account information of the user and the fingerprint information template of the user.

8. The fingerprint lock system as claimed in claim 7, wherein the fingerprint lock comprises controlling and opening the fingerprint lock when the current fingerprint information is matched with the fingerprint information template.

* * * * *